June 12, 1923.
C. A. PURDY
DOUGHNUT MACHINE
Filed Jan. 19, 1922
1,458,197
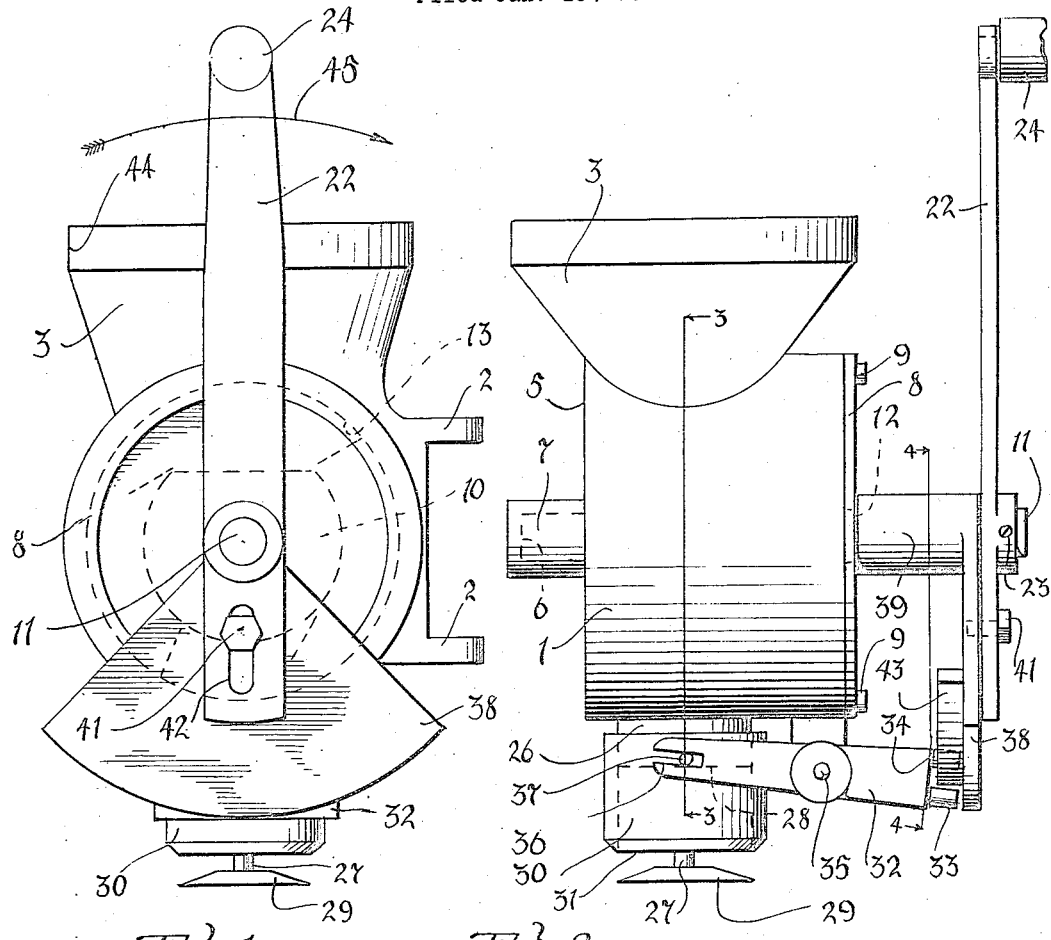
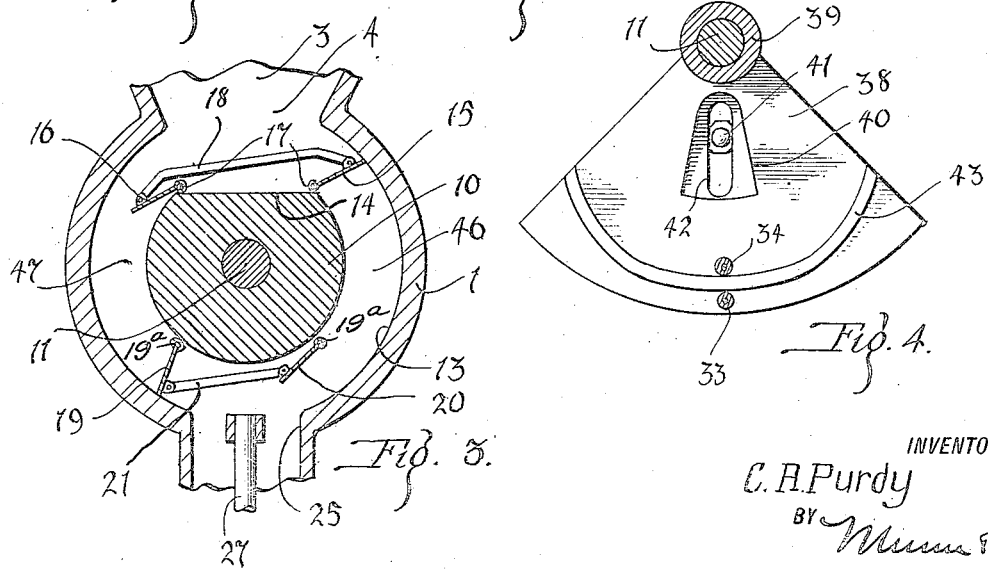
INVENTOR
C. A. Purdy
BY Munn & Co.
ATTORNEYS Patented June 12, 1923.

1,458,197

UNITED STATES PATENT OFFICE.

CHESTER A. PURDY, OF CHICAGO, ILLINOIS.

DOUGHNUT MACHINE.

Application filed January 19, 1922. Serial No. 530,413.

*To all whom it may concern:*

Be it known that I, CHESTER A. PURDY, a citizen of the United States, and a resident of Chicago, in the county of Cook and State of Illinois, have invented a new and useful Improvement in Doughnut Machines, of which the following is a full, clear, and exact description.

My invention relates to improvements in doughnut machines, and it consists in the combinations, constructions and arrangements herein described and claimed:

An object of my invention is to provide a device of the character described, in which the amount of dough forced through the cutting die may be varied to produce thin or thick doughnuts.

A further object of my invention is to provide a device of the character described, in which the dough is first drawn into the device, then forced through the die.

Other objects and advantages will appear in the following specification, and the novel features of the invention will be particularly pointed out in the appended claims.

My invention is illustrated in the accompanying drawings, forming part of this application, in which—

Fig. 1 is a front elevation of an embodiment of my invention,

Fig. 2 is a side elevation of the mechanism illustrated in Fig. 1,

Fig. 3 is a sectional view along the line 3—3 of Fig. 2,

Fig. 4 is a sectional view along the line 4—4 of Fig. 2.

In carrying out my invention, I make use of a cylindrical casing 1, which is provided with pivotal bearing members 2, by means of which the casing 1 may be hingedly supported in a horizontal plane. The casing 1 is provided with a hopper 3 communicating with the interior of the casing by means of an opening 4 in the bottom wall thereof. The casing 1 is provided with a closed end portion 5, which end portion is fashioned to include an outwardly extending integral bearing member 6. The bearing member 6 is, as the end 5, closed at the outer end, as shown at 7. A removable plate 8 is secured to the opposite end of the casing 1 by means of screws 9 and serves as a closure for that end of the casing.

Means for drawing dough from the hopper 3 down into the casing 1 is provided in a compound valve mechanism which comprises a solid metal cylinder 10, which is carried upon a shaft 11, one end of the shaft 11 being supported in the bearing member 6 and its opposite end projecting through an opening 12 in the plate 8 so that the metal cylinder 10 is rotatably disposed within the casing 1. The inner walls 13 of the casing 1 are concentric the shaft 11 and are ground so as to provide a perfect bearing surface. The upper side of the cylindrical member 10 is flattened, as shown at 14. A pair of hingedly mounted valve plates 15 and 16 are pivotally mounted, as shown at 17 at each side of the flattened portion 14 and these valve plates are arranged to operatively contact the bearing side walls 13 of the casing 1.

A pair of link members 18 are pivotally connected at their opposite ends to the valve plates 15 and 16, respectively, so that when one of the valve plates are brought into engagement with the bearing side wall 13, the opposite plate is moved down out of engagement with the side wall 13.

A second pair of valve plates 19 and 20 are hingedly mounted upon pins 19ª carried by the end wall of the casing 1 and are disposed directly opposite the valve plates 15 and 16. The valve plates 19 and 20 are also connected to one another by links 21 which are pivotally mounted adjacent the outer edge of the plates, as shown in Fig. 4.

Means for oscillating the cylindrical member 10 to actuate the valve plates 15, 16, 19 and 20 is provided in a handle 22, which is mounted upon the outer end of the shaft 11 and held in place by means of the set screws 23. The handle 22 is provided with a transverse hand grip 24 adjacent its outer end, as is shown in Fig. 2.

A delivery port 25 is provided in the lower wall of the casing 1 and communicates with a tubular member 26. A vertical stem 27 is supported in the exact center of the tubular member 26 and extends beyond the mouth 28 of the member 26. A sharp edged circular die member is supported upon the lower end of the stem 27. A second die member 30 having the shape of an annulus is arranged to be lowered to contact with the circular die member 29 to shear-off the portion of the dough forced out between the edge 31 of the die member 30 and the circular die member 29.

Means for moving the annular die member 30 and for synchronizing its movement with the operation of the valve compound is provided in a pivotally mounted U-shaped lever 32. The lever 32 is provided with a pair of rollers 33 and 34, respectively, which are spaced apart and in vertical alinement with one another and which are mounted on axes transverse to the pivotal support 35 of the lever 32. The opposite end of the lever 32 is formed with longitudinal grooves 36 adjacent its outer ends. The grooves 36 are arranged to engage outwardly extending pins 37 on the die member 30 so that movement of the lever 32 will occasion the longitudinal movement of the annular die member 30.

A cam member 38 is pivotally disposed by means of a transverse sleeve 39 upon the shaft 11. The cam member 38 has a triangular shaped opening 40, as shown in Fig. 3, through which opening a bolt 41 is projected. The bolt 41 is carried in a slot 42, longitudinally disposed through the lever 22 below the shaft 11. An irregular arcuate cam thread 43 is disposed on the inner surface of the cam member 38 and between the rollers 33 and 34. When the cam member 38 is oscillated with the shaft 11, the lever 32 will move upon its pivotal point 35 and cause the annular die member 30 to rise or fall, as the case may be.

From the foregoing description of the various parts of the device, the operation thereof may be readily understood. Dough is placed in the hopper 3, or in a larger hopper which may be disposed over the small hopper 3 with its opening in close engagement with the opening 44 of the hopper 3. The handle 22 is oscillated back and forth. Oscillatory movement of the handle 22 will cause the valve plates 15, 16, 19 and 20 to operate and cause the dough to be drawn into the casing 1 and delivered through the port 25 to the die. For the purpose of explanation, let us assume that the handle 22 is being moved in the direction indicated by the arrow 45, i. e., clockwise and that some of the dough is already disposed in the space 46 between the bearing wall 30 and the outer wall cylindrical member 10. The valve plate 15 will be pressed by weight of the dough in the space 46 in close engagement with the side wall 13 of the casing 1 and the valve plates 16 will, by means of the links 18, be forced to the position shown in Fig. 1 and Fig. 4. As the handle 22 is moved, the dough in the space 46 will be forced down and through the port 25. The positions of the lower valve plates 19 and 20 at this time are also clearly shown in Fig. 4.

The positions of the valve plates 19 and 20 this time are clearly shown in Fig. 4. It will be noted that the plates 19 and 20 are mounted to pivot toward one another alternately, while the plates 15 and 16 pivot away from one another alternately. At this particular time, the plate 20 is hinged close to the sides of the cylinder 10 and the plate 19 is hinged in close engagement with the side walls 13 of the casing 1. As the handle 22 is slowly moved in a clockwise direction, the dough is forced by means of the valve plate 15 out through the delivery port 25 and as the handle 22 moves, it carries with it the cam member 38. When the handle 22 has practically reached the extent of its counterclockwise movement, the cam 38 will have moved, carrying with it the rib 43 to a position such as to cause the lever 32 by means of its engagement with the rib 43 to move the annular die 30 down and shear the projected dough by its contact with the circular die 29. A ring shaped piece of dough is thereby formed which drops into the kettle of boiling fat or a suitable receptacle.

The handle 22 is now moved in a counterclockwise direction and as it moves, the valve plate 15' will be hinged back adjacent the sides of the cylinder 10 and the valve plate 16 will be moved by means of the links 18 into engagement with the sides 13 of the casing 1. Dough, which is now in the space 47 will be forced down and out of the port 25 in precisely the same manner as in the space 46. The valve plates 19 and 20 at this time will be moved so that the plate 19 is in close engagement with the cylinder 10 and the plate 20 will bear against the wall 13 of the casing 1.

It should also be noted that as the handle 22 moves in the counterclockwise direction, that because the plate 16 is in closed engagement with the wall 13 of the casing 1, the dough in the hopper 3 will be drawn down and will follow the plate 16 into the space 47. When the reverse movement of the handle 22 is brought about and the plates 15 and 16 assume the position shown in Fig. 4, the plate 16 will pass beneath the dough in the space 47 and will not close in engagement with the walls 13 until the handle is again moved in the counterclockwise direction.

Means for varying the size or thickness of the finished product is provided in a triangular opening 40 (see Fig. 3) and a bolt 41 slidably supported on the handle 22. When the bolt is in the position shown in Fig. 3, a relatively short movement of the handle 22 will cause the cam member 38 to move, but when the bolt is at the lower end of the slot 42, then the movement of the lever is greater before the cam 38 starts to function and consequently a greater amount of dough will have been forced out through the port 25 before the die 30 is brought into operation.

I claim:

1. A device of the character described comprising a casing, a rotor mounted within the casing, a pair of valve members hinged to the rotor, a pair of valve members hinged to the casing adjacent the rotor, said casing being provided with an inlet port and a delivery port, and means for manually oscillating the rotor, whereby dough or the like introduced to said casing may be delivered through said delivery port.

2. In a device of the character described, a rotor, a pair of valve plates hingedly mounted on the rotor, means for manually operating said rotor, a second pair of valve plates hingedly mounted adjacent said rotor, and links connecting said first named valve plates one to another and said last named valve plates one to another.

3. A device of the character described comprising a casing, a valve mechanism disposed within said casing, a pair of cooperating die members, a handle for operating said valve mechanism to force dough admitted to said casing through said die members, and means associated with said handle for moving one of said die members toward the other die member to sever a portion of the dough after it has passed through the dies, said means comprising a cam member having an irregular arcuate thread on one surface thereof, said cam member arranged to move with said handle, and a lever operatively connected to the movable one of said die members and arranged to operatively engage said irregular arcuate thread.

4. In a device of the character described, a casing having cylindrical side walls, an inlet and a discharge opening, a cylindrical body member rotatably disposed in said casing, a pair of spaced apart valve plates hingedly mounted on said body member, said plates being of greater length than the distance between the body member and the side walls of the casing, a link for operatively connecting said plates to one another, a second pair of valve plates similar in construction to said first named plates hingedly mounted on said casing and diametrically opposed to said first named plates, said last named plates being connected to one another by a link, and means for oscillating said body member to operate said valve plates.

5. A casing having cylindrical side walls, an inlet opening and a discharge opening, a cylindrical body member rotatably disposed in said casing, a pair of spaced apart valve plates hingedly mounted on said body member, said plates being of greater length than the distance between the body member and the side walls of said casing, a link operatively connecting said plates to one another so that the outer extremities of said plates are at a greater distance from one another than their pivotal points, a second pair of valve plates similar in construction to said first named plates hingedly mounted on said casing and diametrically opposed to said first named plates, said last named plates being connected to one another by a link, but arranged so that their outer extremities are closer to one another than their pivotal points, and means for oscillating said body member to operate said valve plates.

6. A device of the character described comprising a casing, a valve mechanism disposed within said casing, a pair of cooperating die members, a handle for operating said valve mechanism to force dough admitted to said casing through said die members, a bolt transversely disposed on said handle and arranged to be moved laterally on said handle at will, and means associated with said handle for moving one of said die members toward the other die member to sever a portion of the dough after it has passed through the dies, said means comprising a cam member having an irregular arcuate thread on one surface thereof, said cam member having a triangular shaped opening therethrough for receiving said bolt whereby said cam member may be moved by said handle, and a lever operatively connected to the movable one of said die members and arranged to operatively engage said irregular arcuate thread.

CHESTER A. PURDY.